US007983804B2

(12) United States Patent
Cox et al.

(10) Patent No.: US 7,983,804 B2
(45) Date of Patent: Jul. 19, 2011

(54) SYSTEM FOR MINIMIZATION OF AIRCRAFT DAMAGE ON COLLISION

(75) Inventors: Isaiah Watas Cox, Baltimore, MD (US); Joseph Jeremiah Cox, East St Kilda (AU); Jonathan Sidney Edelson, Portland, OR (US)

(73) Assignee: Borealis Technical Limited (GI)

( * ) Notice: Subject to any disclaimer, the term of this patent is extended or adjusted under 35 U.S.C. 154(b) by 948 days.

(21) Appl. No.: 11/899,001

(22) Filed: Aug. 29, 2007

(65) Prior Publication Data

US 2008/0103642 A1 May 1, 2008

(30) Foreign Application Priority Data

Aug. 30, 2006 (GB) .................................. 0617068.2

(51) Int. Cl.
*G01C 23/00* (2006.01)

(52) U.S. Cl. ....................................... 701/3; 244/103 R

(58) Field of Classification Search .................... 244/50, 244/100 R, 103 R; 318/39, 139; 701/3
See application file for complete search history.

(56) References Cited

U.S. PATENT DOCUMENTS

| | | | |
|---|---|---|---|
| 2,320,547 A | 6/1943 | Tiger | |
| 2,460,387 A | 2/1949 | Hunter | |
| 2,631,476 A | 3/1953 | Ravigneaux | |
| 2,687,857 A | 8/1954 | Caldwell et al. | |
| 3,088,699 A | 5/1963 | Larson | |
| 3,109,324 A | 11/1963 | Locher | |
| 3,711,043 A | 1/1973 | Cameron-Johnson | |
| 3,764,094 A | 10/1973 | Cross | |
| 3,807,664 A | 4/1974 | Kelly, Jr. et al. | |
| 3,809,975 A * | 5/1974 | Bartels | 318/39 |
| 3,850,389 A | 11/1974 | Dixon | |
| 3,874,618 A | 4/1975 | Bates | |
| 3,977,631 A | 8/1976 | Jenny | |
| 4,659,039 A | 4/1987 | Valdes | |
| 5,086,994 A | 2/1992 | Donnelly et al. | |
| 5,104,063 A | 4/1992 | Hartley | |
| 5,875,994 A | 3/1999 | McCrory | |
| 6,411,890 B1 | 6/2002 | Zimmerman | |
| 6,657,334 B1 | 12/2003 | Edelson | |
| 6,690,295 B1 | 2/2004 | De Boer | |
| 6,838,791 B2 | 1/2005 | Edelson | |
| 6,922,037 B2 | 7/2005 | Edelson | |
| 7,445,178 B2 * | 11/2008 | McCoskey et al. | 244/50 |
| 2004/0059497 A1 | 3/2004 | Sankrithi | |
| 2004/0112662 A1 | 6/2004 | Ogino et al. | |
| 2004/0236478 A1 | 11/2004 | Le Gallo et al. | |
| 2005/0253020 A1 | 11/2005 | McCoskey et al. | |
| 2005/0253021 A1 | 11/2005 | McCoskey et al. | |
| 2006/0065779 A1 | 3/2006 | McCoskey et al. | |
| 2006/0255555 A1 | 11/2006 | Lindahl | |
| 2006/0273686 A1 | 12/2006 | Edelson et al. | |

FOREIGN PATENT DOCUMENTS

| | | |
|---|---|---|
| EP | 0756556 B1 | 9/1999 |
| EP | 1486798 A2 | 12/2004 |
| GB | 1129915 | 10/1968 |
| GB | 1192273 | 5/1970 |
| GB | 2408492 A | 6/2005 |

(Continued)

*Primary Examiner* — Mark Hellner

(57) ABSTRACT

A system for minimizing damage on collision to a vehicle having at least one self-propelled wheel is disclosed. The system comprises a motor in a wheel of said vehicle which drives the vehicle, means for measuring the speed of said wheel, means for measuring the torque of said motor, means for monitoring the ratio of the torque of the motor to the speed of the wheel, and means for stopping said motor when torque: speed ratio exceeds an acceptable value.

18 Claims, 1 Drawing Sheet

FOREIGN PATENT DOCUMENTS

| | | | |
|---|---|---|---|
| WO | WO-2002/053413 | A2 | 7/2002 |
| WO | WO-2005/035358 | A2 | 4/2005 |
| WO | WO-2005/112584 | A2 | 12/2005 |
| WO | WO-2006/002207 | A2 | 1/2006 |
| WO | WO-2006/065988 | A2 | 6/2006 |
| WO | WO-2006/113121 | A1 | 10/2006 |

* cited by examiner

SYSTEM FOR MINIMIZATION OF AIRCRAFT DAMAGE ON COLLISION

CROSS-REFERENCE TO RELATED APPLICATIONS

This application claims the benefit of G.B. Patent Appl. No. 0617068.2 filed Aug. 30, 2006, which is assigned to the assignee of the present application and is herein incorporated in its entirety by reference.

BACKGROUND OF THE INVENTION

This invention relates to collision damage avoidance systems for aircraft.

Collisions on the ground at airports, especially on crowded runways, are increasingly frequent. Equipment to sense the presence of other aircraft is expensive and difficult to install on existing, crowded aircraft.

Systems external to aircraft exist, such as a traffic control system at Dallas-Fort Worth International Airport which shows red lights indicating that aircraft should stop, and green for go.

Various taxiing guidance systems within aircraft are disclosed in the art. The degree of automation in taxiing may vary. The degree to which such guidance systems are used to avoid collision or track the location of other aircraft is limited, as is the ability to install such equipment in existing aircraft.

U.S. Pat. No. 6,411,890 to Zimmerman discloses a method for the guidance of aircraft on the taxiways of the airport apron with position lights located on the taxiways and, possibly, other locations on the apron. It comprises the following components: a navigation system to determine the current aircraft position; a sensor on the aircraft to detect position and measure lights, reference information including light positions, a comparison of the path pursued by the navigation system with the reference information, and using the detected lights as waypoints for the navigation system.

U.S. Pat. No. 6,690,295 to De Boer teaches a device for determining the position of an aircraft at an airport, including sensors for detecting radio signals originating from a vehicle. The sensors are positioned at regular intervals from one another on parts of the airport which are accessible to the vehicle. The sensors are fitted in light positions of runway lighting provided at the airport on taxiways, take-off and landing runways and on platforms. The signal originating from a radio altimeter of an aircraft is used as the radio signal. Data communication takes place from the sensors via power supply lines of the light points. A central processing device is provided with warning means to generate a warning if the detected position of the vehicle is outside a predefined area at the airport which is permitted to the vehicle.

A sophisticated control system is utilized in a Space Shuttle Orbiter vehicle. The vehicle uses a conventional type of landing system having an aircraft tricycle configuration consisting of a nose landing gear and a left and right main landing gear. The nose landing gear is located in the lower forward fuselage, and the main landing gear is located in the lower left and right wing area adjacent to the mid-fuselage. The nose wheel is equipped with a ground proximity sensor, in order to determine Weight on Nosegear (WONG), a parameter required during landing. After landing, when WONG and other safety parameters have been established, Nose Wheel Steering (NWS) is enabled. One or more steering position transducers on the nose wheel strut transmit nose wheel steering position feedback to a comparison network so that the nose wheel commanded and actual positions may be compared for position error.

Various means for avoiding collisions of aircraft with ground objects are disclosed in the art.

GB 2408492 to Greene discloses an obstacle avoidance system for a rotary wing aircraft comprising display means, sensing means to determine position, altitude and course, a moving map providing data relating to an area surrounding the aircraft, means for determining/indicating first and second hazardous zones and audible means for indicating an obstacle. The first hazardous zone is a first distance from the aircraft and is represented by a first display color. The second hazardous zone is a second distance, less than the first distance, from the aircraft and is represented by a second display color, indicating greater danger. The audible means may produce audible clicks when the aircraft is within a third distance, also less than the first distance, from an obstacle. The clicks may increase in frequency and volume as the aircraft moves closer to the obstacle. The position sensing means may include a global positioning satellite (GPS) system.

GB 1192273 to Hoban and Smith discloses a terrain avoidance system for an airborne vehicle comprising an intermittently operated, directionally ranging, pulsed energy system for intermittently sensing the position of terrain-obstacles relative to a velocity vector of the vehicle, and a prediction computing means responsive to the information provided by the pulsed energy system and to the inertial motion of the pulsed energy system for predicting the locations of the terrain obstacles relative to the system during intervals between the operations of the intermittently operated pulsed energy system.

EP 1486798 to Mork and Bakken discloses a collision avoidance system comprising comprises a multi-part tubular mast having devices for fixing a solar panel and a radar antenna; an elongate radar antenna in an environment-protective casing, which, with an electronics unit, forms a radar system for synthesized radar detection of an aircraft in a radar coverage area; a central processing unit for identifying on the basis of information from the radar system an aircraft which is in a zone of the radar coverage area and which on the basis of radar information such as direction, distance and/or speed computes a collision danger area; and a high-intensity light system and radio transmitter system that can be activated by the central processing unit upon detection of an aircraft in a collision danger area.

Such collision avoidance methods use light, radar, pulse, or GPS technology to prevent contact of the aircraft with obstacles.

Means for sounding an alarm or stopping movement of a vehicle or moving component upon sensing the presence of, or coming into contact with, an obstacle are disclosed in the art.

In WO02/053413 Buchannan discloses a vehicle having a rear liftgate which employs the sensors used for sensing objects when a vehicle is in reverse to also prevent vehicle damage when the power liftgate is activated. Specifically, the method for sensing an obstruction to the rear of a vehicle comprises the steps of disposing at least one sensor in the liftgate and generating a first signal when the sensor indicates an obstruction when the liftgate is opening. In another aspect of the invention, the method further comprises the step of generating a second signal when the sensor indicates an obstruction when the vehicle is reversing. The apparatus of the present invention comprises at least one sensor disposed in the liftgate and means for generating a first signal when the sensor indicates an obstruction when the liftgate is opening.

In another aspect of the invention, the apparatus further comprises means for generating a second signal when the sensor indicates an obstruction when the vehicle is reversing.

GB 1129915 to Narutani discloses a vehicle having one of three ground wheels driven by an electric motor energized through a circuit including a switch operable by a driver. A bumper is elastically mounted on the vehicle frame so as to be displaceable from a normal position upon encountering an obstacle and is so connected with the switch that the switch is opened when the bumper is displaced and cannot be closed until the bumper returns to the normal position.

US 2004/236478 discloses a vehicle including two moving openable members on one side of the vehicle and a single obstruction detector for both of the two openable members. The obstruction detector includes a light sensor that detects light at the closing contact line and an analysis circuit for analyzing the timing of the light received by the sensor. The analysis circuit compares the distribution of the light received by the light sensor to a reference distribution.

In US2004/112662 Hiroyuki and Shigeki disclose a bumper sensor unit. The unit includes a cord-shaped pressure sensitive sensor fixed around a bumper of a running device to detect a contact of an obstacle based on a signal output from the cord-shaped, pressure sensitive sensor. In that case, contact detecting means comprises a filtering section for removing the oscillation frequency component of a contact detecting object from the signal output from the cord-shaped pressure sensitive sensor.

Motor-Generator machines able to provide high torque at low speed, which are compact, are disclosed in the art.

In WO05/112584 Edelson discloses a motor-generator machine comprising a slotless AC induction motor. The motor disclosed therein is an AC induction machine comprising an external electrical member attached to a supporting frame and an internal electrical member attached to a supporting core; one or both supports are slotless, and the electrical member attached thereto comprises a number of surface mounted conductor bars separated from one another by suitable insulation. An airgap features between the magnetic portions of core and frame. Electrical members perform the usual functions of rotor and stator but are not limited in position by the present invention to either role. The stator comprises at least three different electrical phases supplied with electrical power by an inverter. The rotor has a standard winding configuration, and the rotor support permits axial rotation.

In WO2006/002207 Edelson discloses a motor-generator machine comprising a high phase order AC machine with short pitch winding. Disclosed therein is a high phase order alternating current rotating machine having an inverter drive that provides more than three phases of drive waveform of harmonic order H, and characterized in that the windings of the machine have a pitch of less than 180 rotational degrees. Preferably the windings are connected together in a mesh, star or delta connection. The disclosure is further directed to selection of a winding pitch that yields a different chording factor for different harmonics. The aim is to select a chording factor that is optimal for the desired harmonics.

In WO2006/065988 Edelson discloses a motor-generator machine comprising stator coils wound around the inside and outside of a stator, that is, toroidally wound. The machine may be used with a dual rotor combination, so that both the inside and outside of the stator may be active. Even order drive harmonics may be used, if the pitch factor for the windings permits them. In a preferred embodiment, each of the coils is driven by a unique, dedicated drive phase. However, if a number of coils have the same phase angle as one another, and are positioned on the stator in different poles, these may alternatively be connected together to be driven by the same drive phase. In a preferred embodiment, the coils are connected to be able to operate with 2 poles, or four poles, under H=1 where H is the harmonic order of the drive waveform. The coils may be connected together in series, parallel, or anti-parallel.

In US2006/0273686 a motor-generator machine is disclosed comprising a polyphase electric motor which is preferably connected to drive systems via mesh connections to provide variable V/Hz ratios. The motor-generator machine disclosed therein comprises an axle; a hub rotatably mounted on said axle; an electrical induction motor comprising a rotor and a stator; and an inverter electrically connected to said stator; wherein one of said rotor or stator is attached to said hub and the other of said rotor or stator is attached to said axle. Such a machine may be located inside a vehicle drive wheel, and allows a drive motor to provide the necessary torque with reasonable system mass.

In WO2006/113121 a motor-generator machine comprising an induction and switched reluctance motor designed to operate as a reluctance machine at low speeds and an inductance machine at high speeds is disclosed. The motor drive provides more than three different phases and is capable of synthesizing different harmonics. As an example, the motor may be wound with seven different phases, and the drive may be capable of supplying fundamental, third and fifth harmonic. The stator windings are preferably connected with a mesh connection. The system is particularly suitable for a high phase order induction machine drive systems of the type disclosed in U.S. Pat. Nos. 6,657,334 and 6,831,430. The rotor, in combination with the stator, is designed with a particular structure that reacts to a magnetic field configuration generated by one drive waveform harmonic. The reaction to this harmonic by the rotor structure produces a reluctance torque that rotates the rotor. For a different harmonic drive waveform, a different magnetic field configuration is produced, for which the rotor structure defines that substantially negligible reluctance torque is produced. However, this magnetic field configuration induces substantial rotor currents in the rotor windings, and the currents produce induction based torque to rotate the rotor.

BRIEF SUMMARY OF THE INVENTION

It can be seen from the above that it would be advantageous to have a system for detecting the presence of an object and stopping a motor before damage occurs due to collision with said object, without the use of complex technology such as light, radar, pulse or GPS to detect said object. It would be particularly advantageous if this could be achieved without adding equipment to the vehicle.

A system for minimizing damage on collision to a vehicle having at least one self-propelled wheel is disclosed. The system comprises a motor in a wheel of said vehicle which drives the vehicle, means for measuring the speed of said wheel, means for measuring the torque of said motor, means for monitoring the ratio of the torque of the motor to the speed of the wheel, and means for stopping said motor when torque: speed ratio exceeds an acceptable value.

Figure 1:
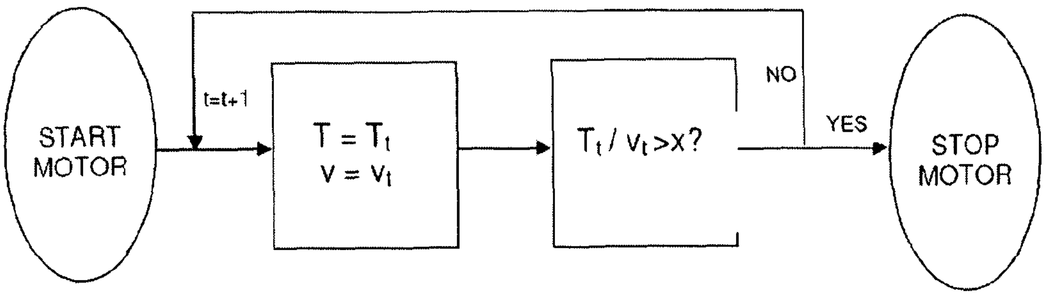
FIG. 1 shows a flow diagram for the software of the first embodiment of the invention.
Figure 2:
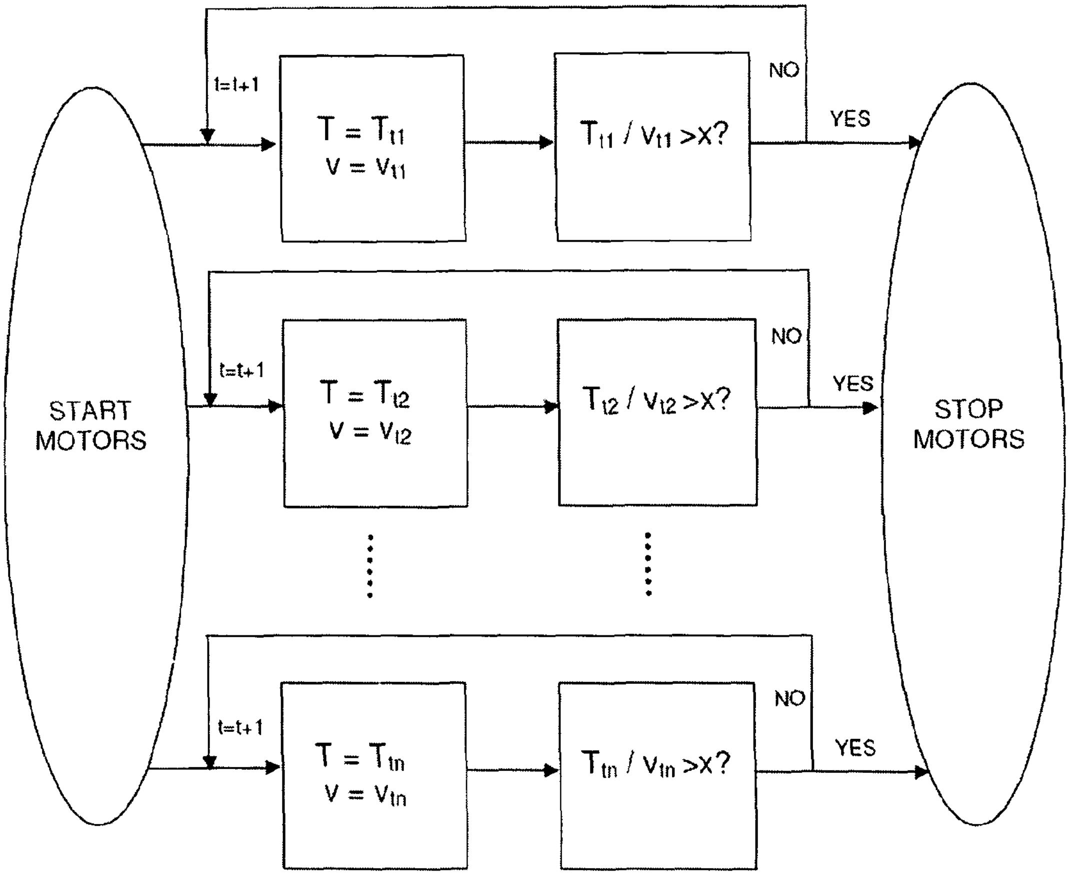
FIG. 2 shows a flow diagram for the software of the sixth embodiment of the invention.

In both figures, the following abbreviations are used:

T=torque v=speed x=limit of acceptable torque:speed ratio t=time n=number of motors.

The figures are examples of implementations of the embodiments and should not be considered to be limiting.

DETAILED DESCRIPTION OF THE INVENTION

In a first embodiment of the invention, a system for minimizing damage on collision to a vehicle comprises a self-propelled wheel having a motor; means for measuring the speed of travel of the wheel; means for measuring the torque of the motor; and means for which monitoring the torque:speed ratio and sends a signal to the motor to stop the motor when the torque:speed ratio exceeds a given value.

The system may be linked to apparatus enabling control of the speed of the wheel and torque of the motor using equipment accessible to the driver or pilot of said vehicle, or a controller outside said vehicle such as airport ground staff. Said equipment may be a joystick, yoke, sidestick, scroll ball, mousepad, or other type of control used in vehicles and may be used solely for controlling the wheel or used for the wheel at certain times and other components of the vehicle at other times.

Said given value of torque:speed ratio at which said signal is sent may be determined by the user or predetermined by the manufacturer.

Said given value of torque:speed ratio is set to be just above the value at a normal operational speed. Thus, the motor automatically stops when torque required to travel at the normal operational speed suddenly increases, that is, when the motor meets resistance caused by an obstacle. An advantage of this is that further damage is prevented. A further advantage is that the motors are prevented from overheating by continuing to run when no forward movement is possible.

Alternatively, said torque:speed ratio may be replaced by a torque model. There are many external variables other than a collision which may affect torque on a wheel and speed of a vehicle, such as bumps or particles on the ground surface, wind resistance, ground slope, humidity, engine condition, APU or other power source strength, and any other variable factor. These variables may be incorporated into a mathematical model to provide a range of expected and acceptable torque values under the expected range of all of these conditions. For example, concerning wind speed, the range should cover expected torque at highest expected wind speed and zero wind speed. The model may be a simple range of acceptable torques, or acceptable torque:speed ratios, and the aircraft may be stopped when the torque or torque:speed ratio exceeds the range. Alternatively, the model may be more complex, such as a normal distribution with a greater probability of an average wind speed than a very high wind speed. In this case, the model would take into account the probability of the particular torque:speed ratio occurring with respect to all factors, and only stop the vehicle if there is a low probability of that ratio occurring with respect to all variables. For example, a particular torque:speed ratio may be dangerously high with respect to wind speeds but average with respect slope, ground bumps and engine condition, and therefore may not be considered dangerous. An advantage of the torque:speed model is that it provides increased accuracy over only considering torque and speed, and prevents unnecessary vehicle stoppage.

Furthermore, there may be user inputting means to enable the actual wind speed, ground slope, humidity, and other factors, of the particular journey about to be undertaken by the vehicle to be inputted directly. Alternatively, there may be sensing means to automatically sense these external variables before a journey is commenced, or a mixture of sensing and user input. Such sensors are already present in many vehicles and existing sensors may be used or new sensors added for this purpose. In this case, the model can compare the actual torque:speed ratio with expected values under the precise conditions of the vehicle. The model is then much more sensitive since, for each external variable, the actual value is known. Expected torque is therefore known at the precise wind speed, humidity, ground slope and all other conditions that the vehicle is under, and a far more accurate torque range for normal operation can be known. When the torque or torque:speed ratio falls outside this range, and the vehicle is therefore stopped, it is far more likely that a real collision has occurred. An advantage of this is that it provides further increased accuracy and further prevents unnecessary vehicle stoppage.

Alternatively, the damage avoidance system may operate in conjunction with other known guidance systems, for example, satellite guidance systems, radar systems, air traffic controller guidance systems, etc. The apparatus may comprise a processor which decides whether to stop the motor based on information from the damage avoidance system of the present invention, as well as information from other guidance systems. Each guidance system may be given a relative weighting, depending on its reliability. Thus, for example, in a particular taxiing event, if the collision avoidance system of the present invention incorporates accurate information about the aircraft's operating conditions and is known to be accurate, it may be given a high weighting, while an old and unreliable radar system liable to faults may be given a low weighting. Thus if the collision avoidance system of the present invention fed information to the processor to stop the motors, while the radar system gave information that the aircraft was on a runway, the radar system may be overruled and the motors stopped. An advantage of this is that it increases the accuracy of the system by increasing the number of sources of information. A further advantage is that it reduces unnecessary stoppages. Said motor may be a high phase order induction motor or any other type of motor or drive means suitable for this purpose. Specifically, said motor may be any of the motors described in the Background section of this patent.

Said means for measuring the speed of said wheel is preferably software but may also be mechanical speed measuring means. Said means for measuring the torque of said wheel is preferably software but may also be mechanical torque measuring means. Existing measuring equipment may be used or new equipment added for this purpose. Said means for measuring may additionally or alternatively measure any other parameters of said motor or said wheel, for example, horizontal or vertical force on said wheel, wheel displacement with respect to aircraft, difference in horizontal or vertical force between wheels, wheel temperature, etc. Said signal may be sent when a specified combination of values of these parameters is reached, for example, when torque:speed ratio exceeds a given value and the horizontal force on any wheel exceeds a second given value, or when speed falls below a given value and the difference between forces on any two wheels exceeds a given value. Said specified combinations of values may be designed to distinguish ruts in the runway from larger obstacles, and may be altered for different terrains.

Said means for monitoring the torque:speed ratio is preferably software which collects data from said means for measuring and computes the ratio of torque to speed at regular intervals. These intervals are preferably small enough to be close to constant monitoring, i.e. many times a second. An advantage of this is that the motor can be stopped before damage is caused by the collision.

In a second embodiment, said vehicle is an aircraft. Said wheel is an undercarriage wheel. Said given value of torque: speed ratio is set to be just above the value at taxiing speed. Said equipment is used to control the undercarriage wheel during taxiing and the entire aircraft during flight. All other features are as in the first embodiment. An advantage of this embodiment is that aircraft are particularly expensive, therefore much expense can be saved through this invention. A further advantage is that, since visibility when taxiing is often poor, and since many small vehicles such as tugs, luggage trucks, moveable loading bridges etc, move around on taxiways close to aircraft, there is a high risk of collision and therefore this invention is particularly useful in this type of vehicle.

In a third embodiment, said signal sent automatically from the software to the motor when the torque:speed ratio exceeds the given value produces an audible alarm as well as or instead of stopping the motor. All other features are as in the first embodiment. An advantage of this is that the driver or pilot becomes aware of the collision and stoppage more rapidly. A further advantage, if the alarm is instead of an automatic stop, is that the pilot can ascertain if whether a real collision has occurred or whether the alarm is false, and unnecessary stops can be avoided. All other features are as in the first embodiment.

In a fourth embodiment, said vehicle is an aircraft and said software can be controlled remotely by airport maintenance staff or air traffic controllers. Thus remote controllers can input the appropriate torque limit or torque:speed ratio, as well as other factors such as wind speed, ground slope etc. Furthermore, said apparatus enabling control of the speed of the wheel and torque of the motor may also be able to be controlled remotely by airport maintenance staff or air traffic controllers. Thus remote controllers can control how fast the aircraft taxis. Control of the software and apparatus can be transferred between airport maintenance staff or air traffic controllers and the pilot of the aircraft and is transferred to the pilot at some time before flight. All other features are as in the first embodiment.

In a fifth embodiment, said software can be controlled by computer systems or satellite. Control of the software can be transferred between computer systems or satellite and the driver or pilot. All other features are as in the first embodiment.

In a sixth embodiment, said vehicle has more than one self-propelled wheel, each having a motor. Said software measures the speed of each wheel and the torque of each motor, and monitors the torque:speed ratios of each self-propelled wheel, and sends a signal to each motor to stop all the motors when the torque:speed ratio of any wheel exceeds a given value. Alternatively, there is a torque model or torque: speed ratio for each self-propelled wheel, as described in the first embodiment. The model may be the same for each wheel or may differ between wheels. For example, if a particular wheel takes more weight during travel, or more torque upon turning, or is on some other way different from other wheels, this can be represented in an appropriate torque model. All wheels may rely on the same user input devices to input, or sensors to sense, wind speed, ground slope and other variable factors, or a group of several wheels may share sensors for increased sensitivity, or each wheel may have an individual sensor for further increased sensitivity. The torque model preferably takes into account the measured or inputted variable factors for each wheel or group of wheels when calculating the acceptable range of torque or torque:speed ratios. All other features are as in the first embodiment.

The invention claimed is:

1. An apparatus for minimizing damage to a vehicle on the occurrence of a collision event, said vehicle having one or more self-propelled wheels, said apparatus comprising:

(a) a motor located in each of said one or more self-propelled wheels, which drives the vehicle;

(b) means for measuring one or more parameters relating to a function of said one or more motors, wherein said one or more parameters are selected from the group consisting of speed of said one or more wheels, the torque of said motor, horizontal force on said one or more wheels, vertical force on said one or more wheels, wheel displacement of said one or more wheels with respect to said vehicle, difference in horizontal or vertical forces between said one or more wheels, and temperature of said one or more wheels; and (c) means for stopping said one or more motors when one or more of said selected parameters exceeds a given acceptable value to indicate a collision event.

2. The apparatus of claim 1 wherein said means for stopping said motor when said selected parameter indicates a collision event comprises means for stopping said motor when said torque exceeds said given acceptable value.

3. The apparatus of claim 2, wherein said given acceptable value is based on a range of expected torque and speed values for said motor in said vehicle.

4. The apparatus of claim 1, further comprising means for determining external variables likely to affect torque on said wheel and speed of said vehicle.

5. The apparatus of claim 4 wherein said external variables are one or more selected from the list consisting of bumps or particles on the ground surface, wind speed, wind resistance, ground slope, humidity, engine condition, strength of APU, and strength of other power source.

6. The apparatus of claim 3, wherein said acceptable value is additionally based on at least one known external variable likely to affect torque on said wheel and speed of said vehicle, wherein said known external variable is sensed or inputted.

7. The apparatus of claim 1 additionally comprising means for sounding an alarm when said one or more parameters indicate occurrence of a collision event.

8. The apparatus of claim 1, in which said motor is one selected from the group consisting of:

a high phase order induction motor;

an alternating current induction machine having a first support comprising an external frame supporting a first electrical member, and a second support internal to and coaxial with said first support comprising a core supporting a second electrical member, and wherein one of said electrical members comprises a stator comprising at least three phases, and the other electrical member comprises a rotor; at least one of said supports being slotless;

a high phase order alternating current rotating machine having an inverter drive providing more than three phases of drive waveform of harmonic order H, and characterized in that windings of said machine have a pitch of less than 180 rotational degrees; and an AC electrical rotating apparatus comprising a rotor, and a substantially cylindrically shaped stator, comprising one surface facing said rotor, and a plurality of conductive coils, wherein each coil is disposed in a loop wound toroidally around said stator; and drive means, for providing more than three drive phases to said coils; and a motor assembly comprising: an axle; a hub rotatably mounted on said axle; an electrical induction motor comprising a rotor and a stator; and an inverter electrically connected to said stator, wherein one of said rotor or stator is attached to said hub and the other of said rotor or stator is attached to said axle.

9. The apparatus of claim 1, in which said vehicle is an aircraft.

10. The apparatus of claim 1, further comprising means for computing a ratio of torque to speed in which at least one of said means for measuring the speed of said wheel, said means for measuring the torque of said motor, and the means for computing the ratio of said torque to said speed is software.

11. The apparatus of claim 9, further comprising:

(a) a processor; and (b) at least one aircraft guidance system, whereby said processor decides whether or not to stop said motor based on said one or more parameters in conjunction with information from the at least one aircraft guidance system.

12. A method for minimizing damage to an aircraft on collision, said aircraft having one or more self-propelled wheels, each of said wheels comprising a motor, said method comprising the steps of:

(a) measuring one or more parameters selected from the group consisting of speed of said one or more wheels, the torque of said motor, horizontal force on said one or more wheels, vertical force on said one or more wheels, wheel displacement of said one or more wheels with respect to said aircraft, difference in horizontal or vertical forces between said one or more wheels, and temperature of said one or more wheels and relating to a function of said one or more motors; and (b) stopping said one or more motors when at least one of said one or more parameters exceeds a given acceptable value, wherein a collision event is indicated.

13. The method of claim 12, further comprising the step of measuring one or more external variables likely to affect torque on said wheel and speed of said vehicle, wherein said acceptable value is based on at least one external variable.

14. An apparatus for minimizing damage to a vehicle on the occurrence of a collision event, said vehicle having one or more self-propelled wheels, said apparatus comprising:

(a) a motor located in each of said one or more self-propelled wheels, which drives the vehicle;

(b) means for measuring one or more parameters relating to a function of said one or more motors;

(c) means for computing a ratio of a torque of one or more said motors to a speed of a corresponding wheel from said parameters;

(d) means for stopping said one or more motors when said ratio of a torque of one or more of said motors to a speed of a corresponding wheel exceeds an acceptable value, wherein a collision event is indicated.

15. The apparatus of claim 14 wherein said means for stopping said one or more of said motors when a collision event is indicated comprise means for stopping said one or motors when said ratio for any one of said one or more motors exceeds an acceptable value.

16. The apparatus of claim 15 wherein the acceptable value is selected from a list consisting of: the same for each wheel and not the same for each wheel.

17. The apparatus of claim 15, wherein said acceptable value is based on one selected from the group comprising: upper limit of torque range, upper limit of torque:speed ratio range, upper limit of acceptable torque based on torque model, and upper limit of acceptable torque:speed ratio based on torque:speed ratio model.

18. The apparatus of claim 14 having means for sounding an alarm when said torque:speed ratio exceeds an acceptable value.

* * * * *